Nov. 18, 1958 R. W. SCHUMANN 2,861,244

MAGNETIC MODULATOR SYSTEM

Filed May 15, 1956 4 Sheets-Sheet 1

INVENTOR
ROBERT W. SCHUMANN

BY Cushman, Darby & Cushman

ATTORNEYS

INVENTOR
ROBERT W. SCHUMANN

BY Cushman, Darby & Cushman
ATTORNEYS

Nov. 18, 1958 R. W. SCHUMANN 2,861,244

MAGNETIC MODULATOR SYSTEM

Filed May 15, 1956 4 Sheets-Sheet 3

INVENTOR
ROBERT W. SCHUMANN

BY Cushman, Darby & Cushman
ATTORNEYS

Nov. 18, 1958 R. W. SCHUMANN 2,861,244

MAGNETIC MODULATOR SYSTEM

Filed May 15, 1956 4 Sheets-Sheet 4

INVENTOR

ROBERT W. SCHUMANN

BY Cushman, Darby & Cushman

ATTORNEYS 2,861,244

MAGNETIC MODULATOR SYSTEM

Robert W. Schumann, Wheaton, Ill., assignor to Sperry Rand Corporation, New York, N. Y., a corporation of Delaware Application May 15, 1956, Serial No. 585,008

14 Claims. (Cl. 332—51)

The present invention relates to the detection of direct current or analog signals and more particularly, to an improved magnetic modulator system.

In electronic data handling operations there is a much felt need for detection of D. C. signals with greater "zero" stability than is possible with conventional circuits. Such improved detection can be provided by the magnetic modulator but its several shortcomings have limited its use.

A magnetic modulator comprises a magnetic element or a pair of magnetic elements to which windings are applied. A symmetrical A. C. magnetizing force of sufficient strength to saturate the element alternately in opposite directions is applied to one of the windings. This excitation signal, which may take one of any number of waveforms such as triangular or sinusoidal, causes an E. M. F. to be induced in the output winding which is substantially symmetrical and free from any even harmonic of the excitation signal. When a D. C. signal is applied to the output winding or to a third input winding the element is accordingly magnetically polarized. This upsets the symmetry of the hysteresis loop and introduces a second-harmonic term in the output waveform which is proportional in amplitude to the magnitude of the magnetic polarization and which reverses in polarity when the magnetic polarization is reversed.

The conventional magnetic modulator systems filter out all but this second harmonic from the output signal and then apply the second harmonic to a phase sensitive rectifier to obtain an accurately amplified signal. However, because the filter is narrow-band, up to 50 cycles or more of excitation may be required before it reaches a steady state, and in many applications, such delay is sufficient to destroy the usefulness of the device. An alternative is to eliminate the filter and to detect the degree of asymmetry in the total output by one of a number of methods. For instance, the peak amplitude of the first half-cycle may be compared with that of the second half-cycle, or the deviation of the peak amplitude on either half-cycle may be compared with a normal amplitude, either type of comparison being usually detected in less than 10 cycles of excitation. However, the gain in speed is offset by a loss in accuracy since all detectors of this type are subject to drift or zero wander. Devices thus far developed for correcting drift depend on electro-mechanical means such as contact interrupters whereby the detector is reset to zero periodically, but these, too, introduce undesirably long delays.

In accordance with this invention, the output of the detector is sampled to determine the correctness thereof. This is accomplished by applying a symmetrical input, or an input known to produce a correct output if there is no error inherent in the detector, at predetermined times in determining whether the output of the detector during these times is correct. If correction is necessary, the output may be at least partially returned to the detector for correcting the drift therein. Alternatively, the output of the detector when in error may be used to adjust the excitation to correct for the error in the detector. This invention also embraces the use of an incorrect output from a detector for correcting for drift or the like in the excitation, said excitation drift effecting an incorrect detector output by biasing the modulator in one direction more during one-half cycle than in the opposite direction during a subsequent half-cycle.

Therefore, it is an object of this invention to provide apparatus for attaining freedom from drift in a magnetic modulator system by sampling the output of the detector in the system and compensatingly correcting for said drift if such is present.

Another object of this invention is to provide apparatus for attaining freedom from drift in the detector of a magnetic modulator system by sampling the output of said detector and compensatingly correcting for drift when present.

Another object of this invention is to provide apparatus for attaining freedom from drift in the detector of a magnetic modulator system by sampling the output of said detector at predetermined times while an unbiased reference modulator is connected to the detector and compensatingly correcting for drift when present by feeding said output back to the detector.

Another object of this invention is to provide, in a magnetic modulator system, means for correcting for drift in the detector or in the excitation means by sampling at predetermined times the output of an unbiased reference modulator and adjusting the excitation means in accordance with said output.

Still other objects of this invention will become obvious to those skilled in the art by reference to the following description of the exemplary embodiments of the apparatus and the appended claims. The various features of the exemplary embodiments may be best understood with reference to the accompanying drawings, wherein:

Figure 1:
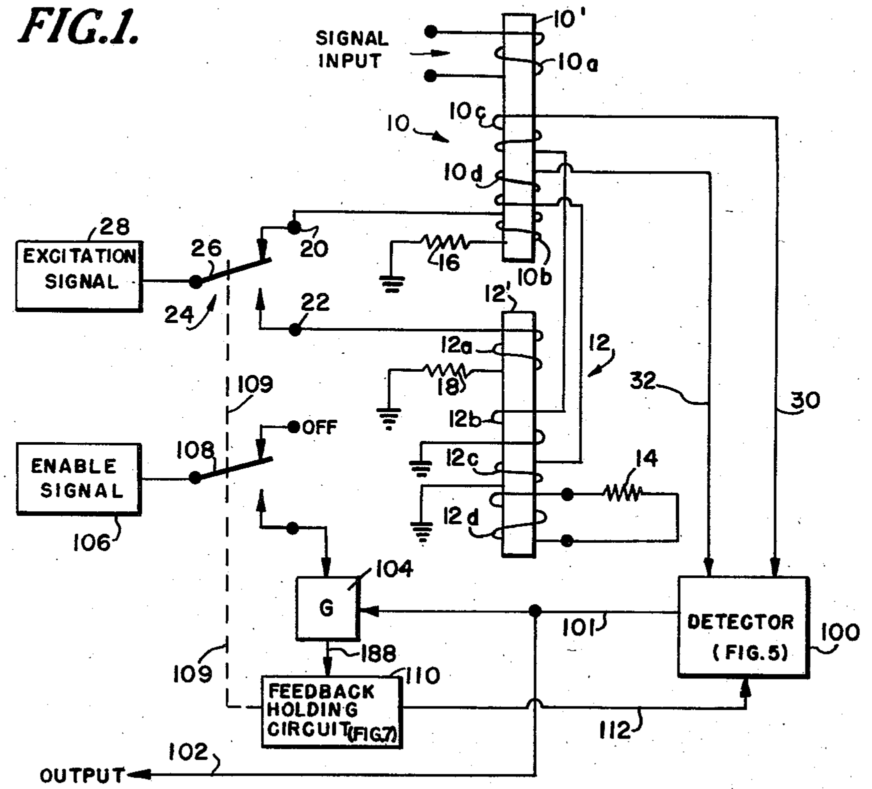
Figure 1 is a schematic diagram illustrating the use of two magnetic modulators to provide analog amplification with good zero stability.

With reference to Figure 1, there is shown a single core modulator system, each modulator 10 and 12 including one core 10' and 12', respectively, these cores are shown as straight bars only for convenience, and it will be understood that in practice they will be of the usual type, such as torroidal with preferably square loop characteristics. Each modulator has four windings with the upper or signal modulator 10 having a direct current signal input winding 10a, an excitation winding 10b and oppositely wound output windings 10c and 10d. In modulator 12, herein referred to as the zero reference modulator, there is also an excitation winding 12a and two oppositely wound output windings 12b and 12c, each connected at one end to ground and in series with the respective output windings 10c and 10d on the signal modulator 10. The fourth winding 12d on modulator 12, corresponding to the signal input or biasing winding 10a, is shunted by a resistor 14 to provide the desired impedance match in the output circuits of the modulators 10 and 12. Each of the excitation windings 10b and 12a are connected at one end through current limiting resistors 16 and 18, respectively, to ground. At their other ends, these windings are connected to opposite terminals 20 and 22, respectively, of double-throw switch 24, armature 26 of which is connected to a source 28 of excitation. The excitation signal is a symmetrically alternating signal, triangular, sinusoidal, pulsating, or square wave in form, so that when applied to either windings 10b or 12a, the respective modulator is alternately magnetically saturated in opposite directions even if a signal biasing input is present on winding 10a. Other means for exciting the modulator may be employed and include any of the different excitation systems described and claimed in my copending application entitled "Magnetic Modulator System," Serial No. 585,104, filed May 15, 1956.

Switch 24 herein may take the form of an electronic switch of any sort with the types in said copending application being examples. When an excitation signal is applied to either of the modulators, both of the respective output windings will provide an output signal. When modulator 12 is excited, lines 30 and 32 will each carry an output symmetrical about its own axis but out of phase 180° with the other, their waveforms being like those shown in Figure 2, column A, lines 30′ and 32′, respectively. Similarly, in absence of a non-symmetrical input to winding 10a, modulator 10 when excited will provide the same type waveforms, with the positive and negative amplitudes on line 30 being equal to each other and to the positive and negative amplitudes on line 32. However, if a non-symmetrical input such as a D. C. or analog signal is applied to winding 10a to provide a net magnetic negative bias in core 10′, the output waveforms on lines 30 and 32 are changed respectively to those shown in Figure 2, column B, lines 30′ and 32′. In a similar manner, when the input to winding 10a provides a net magnetic positive bias in core 10′, the output on lines 30 and 32 is as shown in column C, lines 30′ and 32′, respectively.

Figure 2:
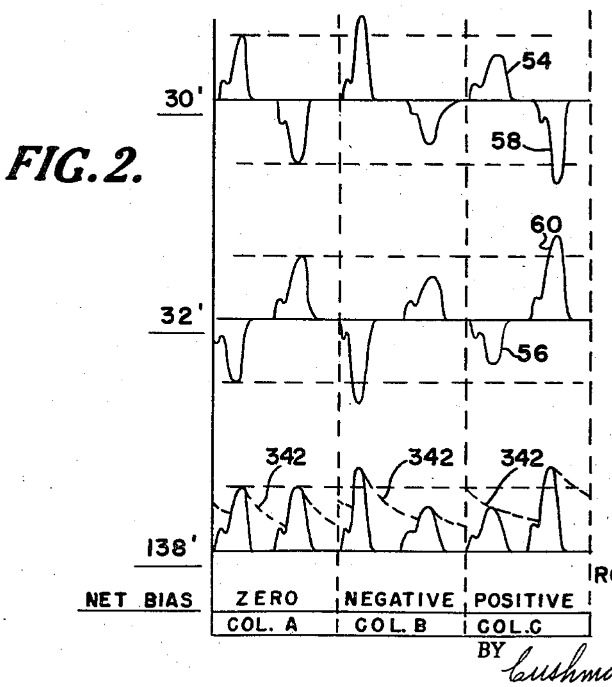
Figure 2 is a chart of waveforms illustrating the operation of the apparatus of Figure 1.
Figures 3, 4:
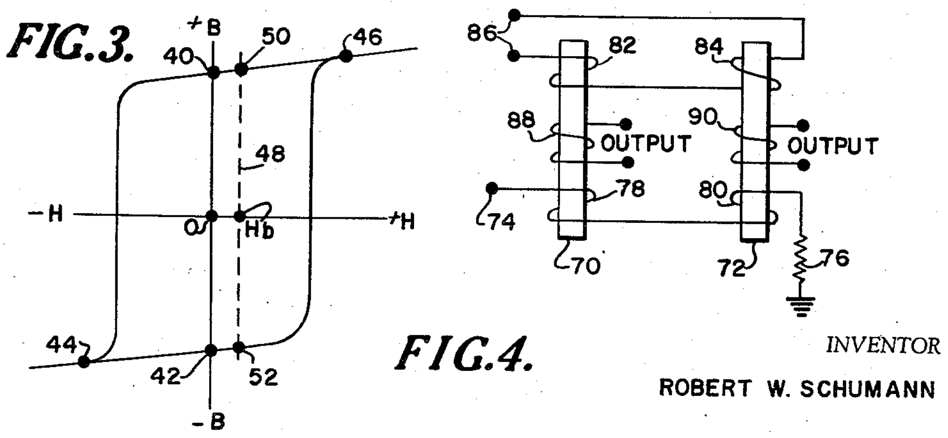
Figure 3 illustrates the hysteresis curve of magnetic material exhibiting a substantial rectangular loop characteristic.
Figure 4 illustrates a multi-element magnetic modulator which may be substituted for either of the single core modulators of Figure 1.

The cause of the different output waveforms on lines 30 and 32 might best be explained with reference to Figure 3 illustrating the preferable hysteresis characteristics of the magnetic modulators utilized with this inventon. When the excitation signal from source 28 in Figure 1 is truly symmetrical, and of sufficient strength to saturate the modulators, each half-cycle of the excitation will move the core from a +B stable saturated condition as illustrated at point 40 on the hysteresis loop to the −B stable saturated state as illustrated by point 42, or vice versa. The voltage in the output windings is induced mainly during the movement of the core from point 40 to the saturated area 44 in one direction and from point 42 to the saturated area 46 in the opposite direction. The change of the cores from point 44 to a stable state at point 42 is gradual and in the saturated area so that little if any voltage is induced during that time. The same is true for the change of the core from point 46 to point 40. Since the hysteresis loop of Figure 3 is symmetrical, the time for a magnetic core to move from point 40 into the saturated area 44 is equal to the time for the same core to move from point 42 to the saturated area 46. However, if a positive bias field $H_b$ is applied to the magnetic element, as by introduction of a positive signal to winding 10a in Figure 1, the modulator becomes magnetcally unbalanced so that the vertical B axis moves to the right as shown by dotted line 48. The +B and −B stable states of the modulator also move to the right and are then respectively at points 50 and 52. Therefore, the switching time from point 50 to the saturated area 44 becomes greater than the switching time from point 52 to the saturated area 46. This phenomenon may most easily be explained by a formula describing the magnetic switching action of a magnetic element:

$$H-H_c=k/t \quad (1)$$

where H is the excitation field, $H_c$ is the field required to start switching, $k$ is a constant, and $t$ is the switching time. If a bias field $H_b$ is applied to the magnetic element, the switching can be described by the following formulae:

$$H+H_b-H_c=k/t_1 \quad (2)$$

where the bias field aids the excitation field, and $$H-H_b-H_c=k/t_2 \quad (3)$$

where the bias field opposes the excitation field. From Formula 2 it is apparent that switching time $t_1$ becomes less than switching time $t$ of Formula 1, while from Formula 3, switching time $t_2$ becomes greater than switching time $t$. Since the voltage-time integral of each switching action is a constant and since the switching time from the +B state to the −B state increased with the addition of bias field 46 as per Formula 2, the voltage induced during that half-cycle is decreased. The half-cycle waveforms 54 and 56 of Figure 2 illustrate this decrease in amplitude. On the opposite half-cycle, however, i. e., when the core moves from its −B state to the +B state while a bias field $H_b$ is applied, the voltage induced will be greater since the switching time is less. This is illustrated by the greater amplitude of the second half-cycle signals 58 and 60 of Figure 2.

Therefore, with the aid of Figures 2 and 3, it is apparent that the outputs on lines 30 and 32 of Figure 1 are induced at the same fundamental frequency as that of the excitation signal of source 28. Even with a D. C. signal applied to winding 10a so that the resultant magnetic field on the modulator is biased in one direction or the other, the excitation signal causes an alternating output on each of lines 30 and 32.

A modification of the single core modulator system as illustrated in Figure 1 is the double-core system as illustrated in Figure 4. For each of the modulators 10 and 12 in Figure 1, there may be provided in their stead a double-core modulator having magnetic cores 70 and 72. The excitation signal may be applied between terminal 74 and ground through resistor 76 and windings 78 and 80 on the two cores respectively. The biasing windings 82 and 84 are wound on the different cores respectively in opposition and receive the biasing signal at terminals 86, or are shunted for impedance matching purposes as the case may be. Output windings 88 and 90 are preferably wound in the same direction on cores 70 and 72, respectively. Windings 78 and 80 are wound in series on their respective cores in a direction such that the currents tending to be induced in windings 82 and 84 are of opposite polarity so that the net induced voltage across terminals 86 is zero or nearly so. This enables a biasing input at terminals 86 to work into a very low impedance source and causes only negligible loading of the output signals in windings 88 and 90. Since the biasing windings 82 and 84 are in series opposition while excitation windings 78 and 80 are connected in a series aiding manner, output windings 88 and 90 may be wound in the same direction on their respective cores to provide an output similar to that on lines 30 and 32 of Figure 1. In fact, when double-core modulators are substituted for the single core system of Figure 1, windings 88 and 90 will be connected to lines 30 and 32, respectively. If desired, the output signals from modulators 70 and 72 may be obtained from opposing output windings on modulators 70 and 72 to obtain cancellation of any even harmonic which may be present in the excitation current. In this manner, the advantages of a double-core modulator may be utilized to obtain a generally easier modulator system to design. However, either the single or double-core type modulators may be used in this invention, the output on lines 30 and 32 being similar for each type modulator.

Since the outputs on lines 30 and 32 of Figure 1 vary in amplitude in accordance with the strength of the biasing field caused by the input signal on winding 10*a*, these outputs may be a measure of the biasing signal input. That is, if the amplitude of the first half-cycle of the output on either winding is compared with the amplitude of the second half-cycle on the same winding, the difference thereof will indicate twice the amplitude of the biasing signal. Therefore, the difference of the amplitudes of an output on either line 30 or 32 for a given half-cycle as caused by the presence and absence of a biasing signal respectively on winding 10*a* indicates the amplitude of the biasing signal itself. With reference to columns B and C of Figure 2, it will be noted that either of the half-cycle outputs on either line 30 or 32 differs from the amplitude of the zero bias waveforms of column A by the same amount for a particular biasing input. Therefore, detection on either half-cycle on line 30 or 32 of the amplitude differential from a level predetermined in accordance with a zero biasing input will indicate the D. C. signal input. With zero bias on winding 10*a*, the pattern of waveforms induced on lines 30 or 32 may be said to be symmetrical about their zero axis respectively. However, when bias is present on winding 10*a*, the waveforms on either lines 30 or 32 as shown in columns B and C of Figure 2 are asymmetric. Detection of asymmetry or deviation of the amplitude of a half-cycle on either output line may be accomplished in detector 100 with the output thereof on lines 101 and 102 indicating the relative strength of the signal inputs to winding 10*a*.

A detector of the type above mentioned is normally inherently subject to drift. That is, even without a D. C. signal input to winding 10*a*, detector 100 may produce incorrect or asymmetrical outputs. In accordance with this invention, the output of the detector is periodically sampled and if found to be incorrect, a correction signal is fed back to the detector so that the output may again represent the true amplitude of the D. C. signal to winding 10*a*. To accomplish the correction of detector 100, the armature 26 of switch 24 is moved downwardly to provide excitation to winding 12*a*. Since modulator 12 has no bias presented thereto, the output on either of lines 30, 32 will be symmetrical, i. e., the positive and negative signals on both lines will have equal amplitudes. Consequently, the output from detector 100 to line 101 should be of constant amplitude for all pulses issuing from the detector. However, if the detector has drifted, the ensuing output pulses will vary in amplitude. To detect the amount of variation in amplitude, the output of detector 100 is presented to gate 104 which has been previously enabled from source 106 by movement of switch arm 108 downwardly in synchronism with the movement of switch arm 26 as indicated by chain line 109. Therefore, the output of detector 100 is delivered to a holding circuit 110 which determines the amount of feedback voltage to place on line 112 to correct for the drift of detector 100.

Figures 5, 6:
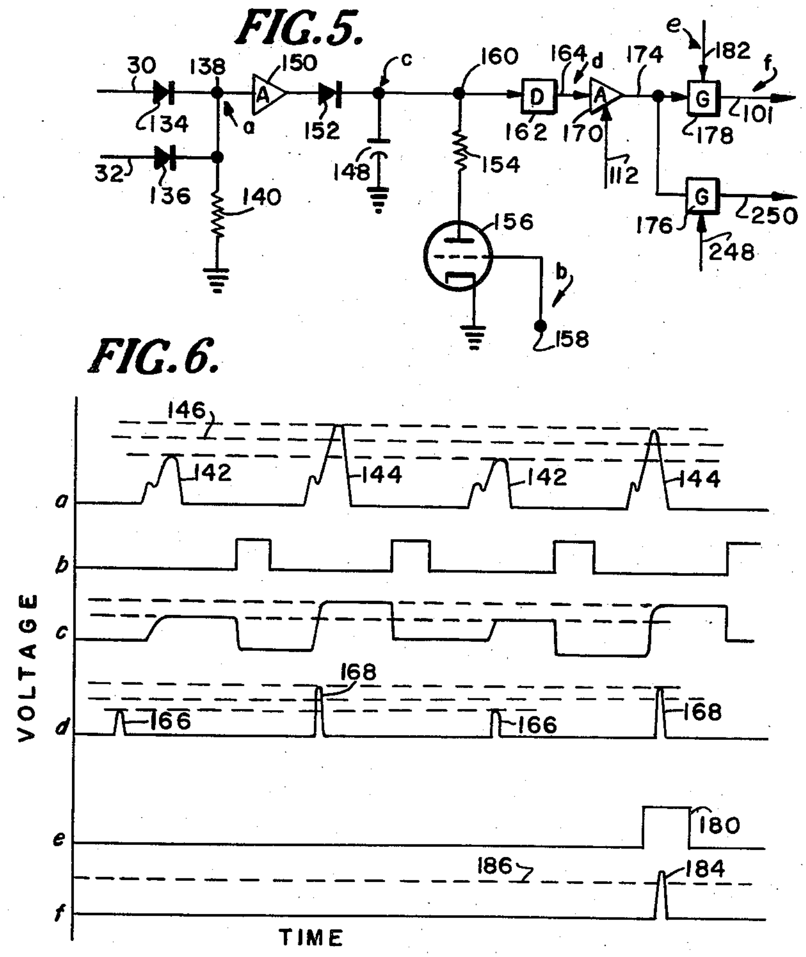
Figure 5 is a schematic illustration of an exemplary detector circuit which may be employed in this invention.
Figure 6 is a chart of waveforms illustrating the operation of the detector in Figure 5.
Figures 7, 8:
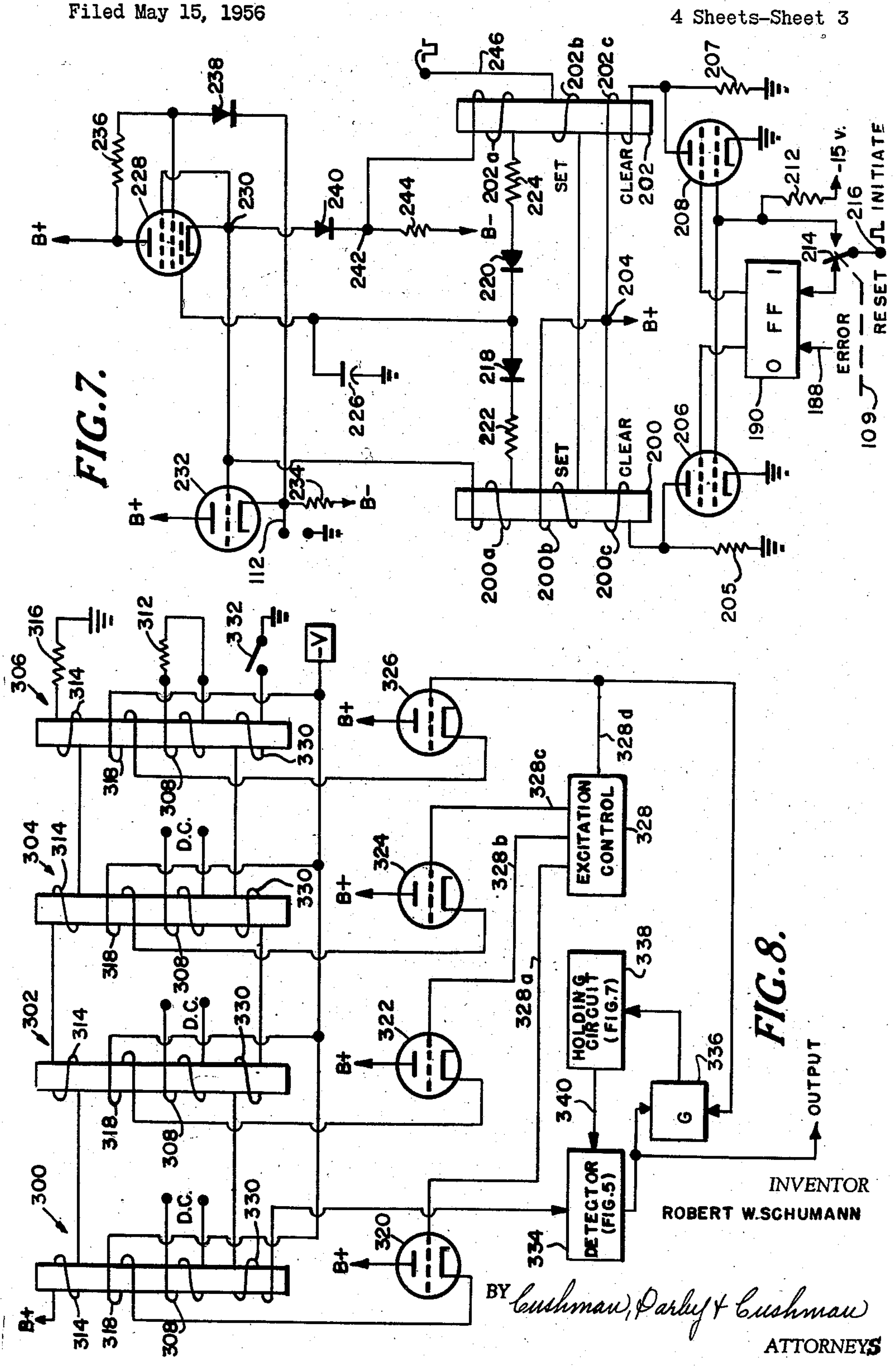
Figure 7 is a schematic diagram of an exemplary feedback holding circuit which may be employed in this invention.
Figure 8 illustrates a specific embodiment of the invention as a time-shared amplifier in which there are three analog or signal magnetic modulators and one zero reference modulator.

As an example of circuitry that may be utilized in detector 100 and the feedback holding circuit 110, reference is now made to Figures 5, 6, and 7. Figure 5 represents a detector, the input lines 30 and 32 of which are the same as those in Figure 1 and receive signals from either a single or double-core modulator system. The signals on lines 30 and 32 are rectified by rectifiers such as diodes 134 and 136, respectively. The outputs of these diodes are applied to a common junction 138 which is referred to ground potential by resistor 140. The combined signal output at junction 138 is represented by the waveforms in Figure 2, line 138'. The waveforms in column A illustrate the signal at junction 138 with zero bias on the magnetic modulator being excited. If the excited modulator is the zero reference modulator 12 of Figure 1, the amplitudes of the first and second half-cycles of the output at junction 138 will be equal. The same is true if modulator 10 is excited and no nonsymmetrical input is applied to the modulator at winding 10*a* or otherwise. However, when modulator 10 is biased, as by a signal to winding 10*a* thereof, so that the net magnetic bias on the modulator is negative, the output at junction 138 will be as illustrated in column B, line 138' of Figure 2. If the net magnetic bias on modulator 10 is positive, the signal for succeeding half-cycles at junction 138 will be as illustrated in column C.

Taking as an example of operation output waveforms similar to those illustrated in column C, the remainder of the detector in Figure 5 will be explained in operation along the waveforms illustrated in Figure 6. Line *a* of Figure 6 illustrates the waveforms at junction 138 when positive bias is applied to winding 10*a* of the modulator system. Because of the bias, the successive half-cycle pulses 142 and 144 are of different amplitude and vary from an unbiased amplitude, indicated by dash line 146, in opposite directions an equal amount. The signals at junction 138 are applied across condenser 148 through amplifier 150 and a rectifier 152, which is preferably a thermionic vacuum triode connected as a diode. The capacitor is, therefore, charged on each half-cycle to the peak value corresponding to the amplitude of the signal 142 or 144 appearing during a given half-cycle. Capacitor 148 is connected in parallel with resistor 154 which is in series with a discharging device such as vacuum tube 156, the cathode of which is grounded. Periodically and in between each half-cycle of output at junction 138, a square wave signal of the type illustrated in line *b* of Figure 6 is applied at terminal 158 to the grid of tube 156. Consequently, the voltage built up on capacitor 148 by the input from junction 138 is periodically discharged through vacuum tube 156. The parameters of condenser 148, resistor 154, and tube 156 are such that condenser 148 is discharged the same amount each time. Therefore, the voltage waveform across capacitor 148 will be similar to that shown in line *c* of Figure 6, and is present at junction 160 for subsequent differentiation into positive and negative "spikes" by differentiation circuits 162. This circuit also "clips" the negative spikes so that the output on line 164 is as illustrated in waveform *d* of Figure 6. It will be apparent, then, that the spikes 166 and 168 represent in amplitude, respectively, the amplitudes of the voltage waveforms 142 and 144 at junction 138. The positive spikes 166 and 168 are further amplified in amplifier 170 whose amplification factor may be controlled by the amount of voltage on a line 112. With an unvarying amplitude of voltage on line 112, amplifier 170 maintains a constant output amplitude. However, with varying voltages on line 112, the output of amplifier 170 on line 174 will correspondingly vary. In this manner, as will hereafter be more fully explained, any drift inherent in the detector system thus far described may be compensated for. Disregarding gate 176 for the time being, the output on line 174 is applied to gate 178. Since it is only necessary to utilize one or the other of the differentiated spikes 166, 168, an enable pulse, such as square wave pulse 180 of Figure 6, is applied to gate 178 over line 182 from any convenient source thereof, to "sample" the output on line 174 during the first or, as shown in Figure 6, during the second half-cycle of the last of a group of cycles of excitation. One or more cycles of excitation may comprise a group thereof in accordance with the number required to allow the modulator to "settle down" before sampling. Stability may be acquired in any number of cycles up to 10 or more (e. g., the reference modulator 12 may be excited at 100 kilocycles for only 100 microseconds to provide 10 cycles of excitation), but normally only one to three cycles are necessary in accordance with this invention to overcome instability.

When gate 178 is enabled by pulse 180, the output thereof on line 101 is the output of the detector 100 (see Figure 1). The amplitude of the output pulse 184 corresponds to the amplitude of spike 168 and of pulse 144. The amount pulse 184 is above dash line 186 of Figure 6, which line represents a predetermined amplitude level (herein termed "threshold") corresponding to an output when no biasing input is applied to the excited modulator, is a measure of the amount of bias on modulator 10 when it is excited. Of course, an enabling pulse to gate 178 could be applied during a first-half cycle so that the last pulse 166 would pass gate 178. In that case the amount the resulting output pulse is below threshold line 186 would represent the amount of positive bias on the excited modulator 10.

From the preceding, it is apparent that any output pulse on line 101 whose amplitude varies from that indicated by threshold line 186 while the zero reference modulator 12 is excited, provides an indication of "error" in the detector itself. That is, since the signals into the detector are symmetrical because of no bias on the reference modulator 12, the output on line 101 will be equal to the threshold amplitude illustrated by line 186 unless there is drift of zero wander in the detector as might be caused by aging, temperature, etc., on component values therein.

While reference modulator 12 is excited, the detector output on line 101 is applied to gate 104 (see Figure 1) and feedback circuit 110, as previously mentioned. The feedback circuit 110 is illustrated in detail in Figure 7 with the output of gate 104 on line 188 being presented to the "0" input of flip-flop 190 as an "error" signal. In operation gate 104 may include a threshold circuit, such as a battery and diode in series, so that only pulses above the threshold amplitude indicated by dotted line 186 in Figure 6 will pass and trigger flip-flop 190 to "0," or alternatively, flip-flop 190 may be made insensitive to inputs unless they exceed an amplitude corresponding to said threshold amplitude and actually trigger the flip-flop. In this manner when modulator 12 is connected to the excitation signal from source 28, threshold triggering signal on line 188 will indicate that the detector is itself providing an incorrect signal. Lack of a threshold triggering signal on line 188, when modulator 12 is excited, however, does not necessarily indicate that the detector is providing an incorrect signal on output line 102, but that the output signal is either absolutely correct or incorrect in the direction opposite to that when there is a threshold triggering signal on line 188. The feedback holding circuit 110 of Figure 1 as illustrated in Figure 7 is such that threshold triggering signals or lack thereof operate to regulate the amount of feedback on line 112 to amplifier 170 of Figure 5.

The feedback holding circuit of Figure 7 includes two magnetic cores 200 and 202, each of which has three windings 200*a*, 200*b*, 200*c*, and 202*a*, 202*b*, and 202*c*. Windings 200*a* and 202*a* may be considered the output windings while windings 200*b* and 202*b* are the "set" windings. Windings 200*c* and 202*c* may be considered the control windings and are each connected to a source of positive current B+ at junction 204. The other end of winding 200*c* is connected to a gating means, such as vacuum tube 206 in parallel with resistor 205 to ground, while the opposite end of winding 202*c* is similarly connected to a gating tube 208 and resistor 207 to ground. The cathodes of tubes 206 and 208 are thereby referenced to ground potential and the screen grids are connected, respectively, to the output terminals "0" and "1" of the conventional multivibrator 190, which is preferably a bistable flip-flop and is treated as such herein, but which may alternatively be a monostable multivibrator. Tubes 206 and 208 are enabled by outputs from the flip-flop 190 to their respective screen grids. The control grids of each of the tubes are connected in common through resistor 212 to a source of potential in the order of −15 volts and in parallel to one terminal of switch 214. When the switch is moved to its right hand position so that positive pulses to terminal 216 are applied to the control grids of gating tubes 206 and 208, these tubes if otherwise enabled will conduct current. In operation, switch 214 is moved to the right in synchronism with the downward movement of switch arms 26 and 108 of Figure 1 as indicated by chain line 109. When these switches are in their up position, switch 214 is to be left so that pulses appearing at terminal 216 set the flip-flop 190 to "1."

The output windings 200*a* and 202*b* in Figure 7 are connected through diodes 218 and 220 along with current-limiting resistors 222 and 224, respectively, across condenser 226. The voltage across condenser 226 determines the amount of current through tube 228 since the condenser is connected to the control grid thereof. An increase of voltage will cause an increase of current through tube 228 and will raise the potential at junction 230 so that tube 232, whose control grid is connected to junction 230 in the form of a cathode follower, will conduct greater current through resistor 234 to potential B−, such potential being above ground at all times. The screen grid of tube 228 receives its current from B+ through resistor 236 and is referenced above the potential of the cathode of tube 232 by a non-linear device, such as diode 238. The cathode of tube 228 is connected through another non-linear device 240 to junction 242, thence through resistor 244 to B−. Output winding 202*a* is also connected to said junction 242.

In operation, the output of gate 104 of Figure 1 is, as above explained, applied to the "0" input of flip-flop 190 to trigger the flip-flop if the output is of threshold amplitude or above when switch arms 26 and 108 of Figure 1, as well as switch arm 214 of Figure 7, are operated, to excite modulator 12 and determine the correctness of the operation of the detector itself. During the time prior to any receipt of an "error" signal on line 188, flip-flop 190 is in its "1" state but when an error signal appears, flip-flop 190 changes to its "0" state. During the transition of the flip-flop to "0" or before a negative pulse is applied on line 246 from any such source to allow current to flow from B+ at junction 204 through windings 200*b* and 202*b* to "set" the cores 200 and 202, respectively. Assuming an error signal has set flip-flop 190 to its "0" state, gating tube 206 is thereby enabled and a positive initiate pulse on terminal 216 will cause an output signal from tube 206 through winding 200*c*. Current flow at this time through winding 200*c* is from junction 204 through tube 206 to ground and is of such amplitude that core 200 will be saturated in its opposite direction to a so-called "cleared" state. The changing of core 200 from one stable state to the other induces a current in output winding 200*a* in the direction indicated by the arrow head on diode 218. This operates to decrease the voltage across capacitor 226 since the current flow at that time is from ground through the condenser, winding 200*a*, diode 240, and resistor 244 to B−, thence back to ground. Decrease of the voltage across condenser 226 decreases the current through tube 228 and consequently decreases the voltage across resistor 234. The voltage then appearing between line 112 and ground is the voltage that is fed back to amplifier 170 of Figure 5 to control the amplification therein.

Continuing with the operation of Figure 7, it will be apparent that if no signal of threshold amplitude appeared on line 188 during the excitation of modulator 12, flip-flop 190 would remain in its "1" position. Thereafter, a positive pulse applied to the control grid of enabled gating tube 208, after a "setting" pulse on line 246, will cause tube 208 to conduct current from junction 204 through winding 202c. This will provide an output across winding 202a in a direction such that a current will flow from resistor 224 through diode 220 to condenser 226, thence to ground and up to B— and back through resistor 244 to winding 202a. Current flowing in this direction will cause the voltage across condenser 226 to increase which, in the converse of manner heretofore explained, will provide an increased voltage on line 112 for feedback to amplifier 170 of Figure 5. Therefore, with periodic operation of switch arm 26, etc., the output of detector 100 on line 101 will in effect oscillate about its true analog value. The voltage across condenser 226 during the period the signal modulator 10 is excited, remains substantially the same so that the amplification produced by amplifier 170 remains practically constant. If no "error" appears on line 188, an output will appear from winding 202a to increase the feedback voltage on line 112. This increase in feedback voltage is of such magnitude as to step the amplification of amplifier 170 to a value such that during the next sampling period, an error output will occur on line 188 to cause a decrease in the feedback voltage on line 112. In this manner, as above mentioned, the output voltage from detector 100 is not a true analog value, but varies by oscillating around the true value to an extent allowable to satisfy the requirements of whatever digital apparatus is connected thereto.

The function of resistors 205 and 207 connected between ground and the control windings 200c and 202c, respectively, is to provide a current of sufficient magnitude from B+ at junction 204 to the magnetic element 200 or 202 not affected by current conduction in tubes 206 or 208, respectively, to change slowly back to its "cleared" state. However, these resistors are not essential since it is the sudden change from the "set" state to the "cleared" state which produces an output in windings 200a and 202a, so that cores 200 and 202 may stay "set" all the time no output is received from their gating tubes 206, 208, respectively.

If it is desired to control the feedback voltage on line 112 positively and substantially prevent oscillation about the true analog value, the output on line 174 of Figure 5 may also be directed through a second gate 176, which gate is enabled by a signal on line 248 during the opposite half-cycle that gate 178 is enabled. In keeping with the example heretofore stated, gate 176 may be enabled during the first half-cycle while gate 178 is enabled during the second half-cycle. In this modification, the "1" input side of flip-flop 190 is no longer connected to switch arm 214, but is connected through suitable gating means comparable to gate 104, or preferably, directly to the output line 250 of gate 176. Therefore, when the amplitude from either gate 176 or gate 178 exceeds the predetermined threshold amplitude at the respective inputs to flip-flop 190, flip-flop 190 will be forced to its "1" or "0" state, respectively, so that the feedback voltage on line 112 of Figures 5 and 7 is positively controlled. In this manner, the asymmetry of the output from detector 100, when reference modulator 12 is excited, is positively detected and positively corrected.

A specific embodiment of the invention heretofore described is illustrated in Figure 8. Three different signal modulators 300, 302 and 304 are shown in conjunction with a reference modulator 306. Each modulator has a signal input winding 308 similar to the biasing winding 10a of Figure 1. Winding 310 on the reference modulator 306 may have an impedance 312 shunted across it for reasons similar to those stated concerning winding 12d of Figure 1. Each of the modulators, including the zero reference modulator 306, has an excitation winding 314 which windings are connected in series with each other from a source of potential B+ through a current limiting resistor 316 to ground. Therefore, each of the magnetic modulators will be saturated in a given direction by the current flow from B+. To make the excitation alternating and symmetrical, each of the magnetic modulators carries a second excitation winding 318 connected in common at one end to a source of potential —V which is more negative than B—. The other ends of windings 318 are respectively connected to the cathodes of gating tubes 320, 322, 324, and 326. The control grid of each of these tubes is connected to excitation control means 328 which may be, for example, a ring or mod-four counter for providing an output on control grid lines 328a, 328b, 328c, and 328d in sequence. Each of the gating tubes 320, 322, 324, and 326 when receiving an output, respectively, from the excitation control means 328 conducts current to its respective excitation winding 318. The current therethrough is of sufficient strength and in a direction to overcome the effect of the constant current through winding 314 so that the excited modulator is saturated in a direction opposite to that caused by current through its winding 314. An excitation system of the type above mentioned is fully described and claimed in my previously mentioned copending application, Serial No. 585,104.

Continuing to refer to Figure 8, each of the modulators 300, 320, 304 and 306 has an output winding 330 connected in series with the other output windings on the remaining modulators through a switch 332, if desired, to ground. Any signal induced in an output winding 330 when its core is alternately excited, is delivered to detector 334 which operates in a manner similar to that heretofore described. When reference modulator 306 receives alternating excitation by conduction of current through tube 326 in response to a signal on line 328d, gate 336 is enabled by the same signal, so that the output from winding 330 of the reference modulator 306 may effectively pass through detector 334 and gate 336 to holding circuit 338 when switch 332 is closed. The holding circuit operates in a manner similar to that illustrated in Figure 7 and produces feedback on line 340 to correct for any error caused by detector 334.

In operation, the sequential outputs from excitation control means 328 causes consecutive alternating excitation to signal modulators 300, 302, and 304 and then to reference modulator 306. Any signal input present on winding 308 of a particular signal modulator excited will be noted in the output winding thereof to detector 334 when switch 332 is closed. On every fourth consecutive output of excitation control means 328, reference modulator 306 is excited and gate 336 is enabled, so that the operation of detector 334 itself may be controlled with reference to its zero operation axis in the manner heretofore explained.

In contrast to Figure 1, the embodiment illustrated in Figure 8 utilizes only one output winding per modulator. The presence of a second winding on the modulator cores helps balance the cores, but is not essential to the basic operation of this invention. When utilizing only one output winding, it is apparent that the detector of Figure 5 need not employ one of diodes 134, 136 or one of gates 176, 178, the latter being in accordance with the half-cycle during which an output is desired. In addition, the detector of Figure 5 whether one or two output windings are employed need not, and preferably does not, employ tube 156. That is, in connection with either Figure 1 or Figure 8, resistor 154 of Figure 5 may be connected to ground and the discharge of condenser 148 may be accomplished through resistor 154 only in a manner similar to that indicated by the dotted lines 342, in Figure 2.

As an example of apparatus to correct for error produced either in the source of excitation or in the detector itself, reference will now be made to Figure 9. The modulators 400 and 402 are similar to those illustrated in Figure 1. The magnetic core 404 for the signal modulator 400 carries a biasing or signal analog winding 406 and an output winding 408. Winding 408 is connected in series to ground with a like output winding 410 on zero reference modulator 402. Two output windings on each core and double-core modulators may be utilized in this embodiment if desired. For excitation, each modulator carries two separate windings. On modulator 400, excitation winding 412 is connected to terminal 414 of a double-pole double-throw switch 416, while output winding 418 is connected to terminal 420 of switch 416. Windings 412 and 418 are wound in opposition to each other and carry currents alternatively when switch 416 is in its up position so that magnetic core 404 is alternatively saturated in opposite directions. On movement of switch 416 downwardly, current is similarly conveyed to excitation windings 422 and 424 on the magnetic core 426 of reference modulator 402. Upon excitation of either modulator 400 or 402, the output thereof is present on line 428 and is detected by detector 430 in the manner heretofore explained. The output of the detector on line 432 effectively passes gate 434 when the gate is enabled by a signal from enable source 436 while switch 438 is in its down position and the reference modulator 402 is being excited.

Alternate excitation is provided to terminals 440 and 442 of switch 416 to excite the different modulators by current generating tubes 444 and 446, respectively. Tubes 444 and 446 are alternately caused to conduct current by the output of multivibrator 448. This multivibrator may be of the free running type with a relatively high output on line 450 being present while a relatively low output is present on lines 452, and vice versa. The outputs on lines 450 and 452 preferably have square waveforms and are applied respectively to the grids of tubes 444 and 446 through suitable cathode follower buffer amplifiers 454 and 456 in series, respectively, with grid resistors 458 and 460. When either of tubes 444 or 446 is caused to conduct thereby, current flows from terminal 462 which connects to voltage B+ through one of the excitation windings, switch 416, and thence through the conductive tube and back to B− via the associated cathode resistor 464.

Normally the total output from tubes 444 and 446 is symmetrical so that equal magnetizing forces are produced by the currents in the excitation windings on either modulator. However, if one of the tubes, because of aging, etc., conducts a current which causes unbalance of the magnetizing forces produced from windings 422 and 424 when switch 416 is in its down position so that the output on line 428 and, consequently, on line 432 is asymmetrical or different than the threshold amplitude as previously explained, or if the detector itself produces such an output to line 432, a signal on line 466 will tend to bring the output from detector 430 back to symmetry at the threshold amplitude thereof. Such readjustment or compensation is accomplished by use of two holding circuits 468 and 470, each of which is similar to the holding circuit 110 of Figure 1, an example of which is schematically illustrated in Figure 7. The signal on line 466 when above the threshold amplitude triggers holding circuit 468 to its "0" state and causes decrease of the voltage output at terminal 472, or alternatively, a reset pulse from source 474 sets the holding circuit 468 to its "1" state if the signal on line 466 is below the threshold amplitude and increases the voltage at terminal 472, all in a manner similar to that heretofore described for the variation of voltage on line 112 of Figure 7. Line 466 is also connected to holding circuit 470 but at its "1" input, while the source of reset pulses 474 connects to the "0" input of holding circuit 470. Therefore, the voltage at terminal 476 will move oppositely to that at terminal 472. That is, when the voltage at terminal 472 decreases because of a triggering input on line 466 of threshold amplitude or greater, the voltage at terminal 476 will increase. Similarly, when the voltage at terminal 472 increases because of the lack of a triggering input on line 466 (i. e., a reset pulse triggers holding circuits 468 and 470) the voltage at terminal 476 will decrease.

When switches 478 and 480 are in their right hand position, the respective voltages at terminals 472 and 476 are conveyed respectively through suitable cathode follower buffer amplifiers 482 and 484 to the cathodes of unidirectional devices such as diodes 486 and 488, respectively. The anodes of diodes 486 and 488 are connected respectively to the control grids of tubes 446 and 444. The voltages at terminals 472 and 476 consequently act as gating or clamping voltages and determine the amount of current tubes 446 and 444, respectively, conduct. As the current from one tube is increased, there is a corresponding decrease in the current from the other tube during their respective half-cycles of excitation. Of course, each tube when conductive during its half-cycle must produce sufficient current to switch the saturation state of the modulator connected thereto.

As an alternative to changing the excitation amplitude above described, it is apparent that only one of the holding circuits 468, 470 need be utilized in conjunction with its respective current generating tube. That is, it is possible to provide the same control by altering the current amplitude of one of the current generating tubes only. For example, if tube 444 were not connected at its grid to diode 488, the output therefrom would be constant in amplitude on alternate half-cycles of excitation. However, the output from tube 446 would remain variable to compensate for the error present on line 432. Of course, the variation in the current amplitude from tube 446 would be twice the variation needed therefrom if tube 444 were connected to diode 488 as illustrated. Variation in the current delivered by either of the tubes may be controlled also by varying the cathode potential in a manner similar to that illustrated for varying the grid potential.

Figure 9:
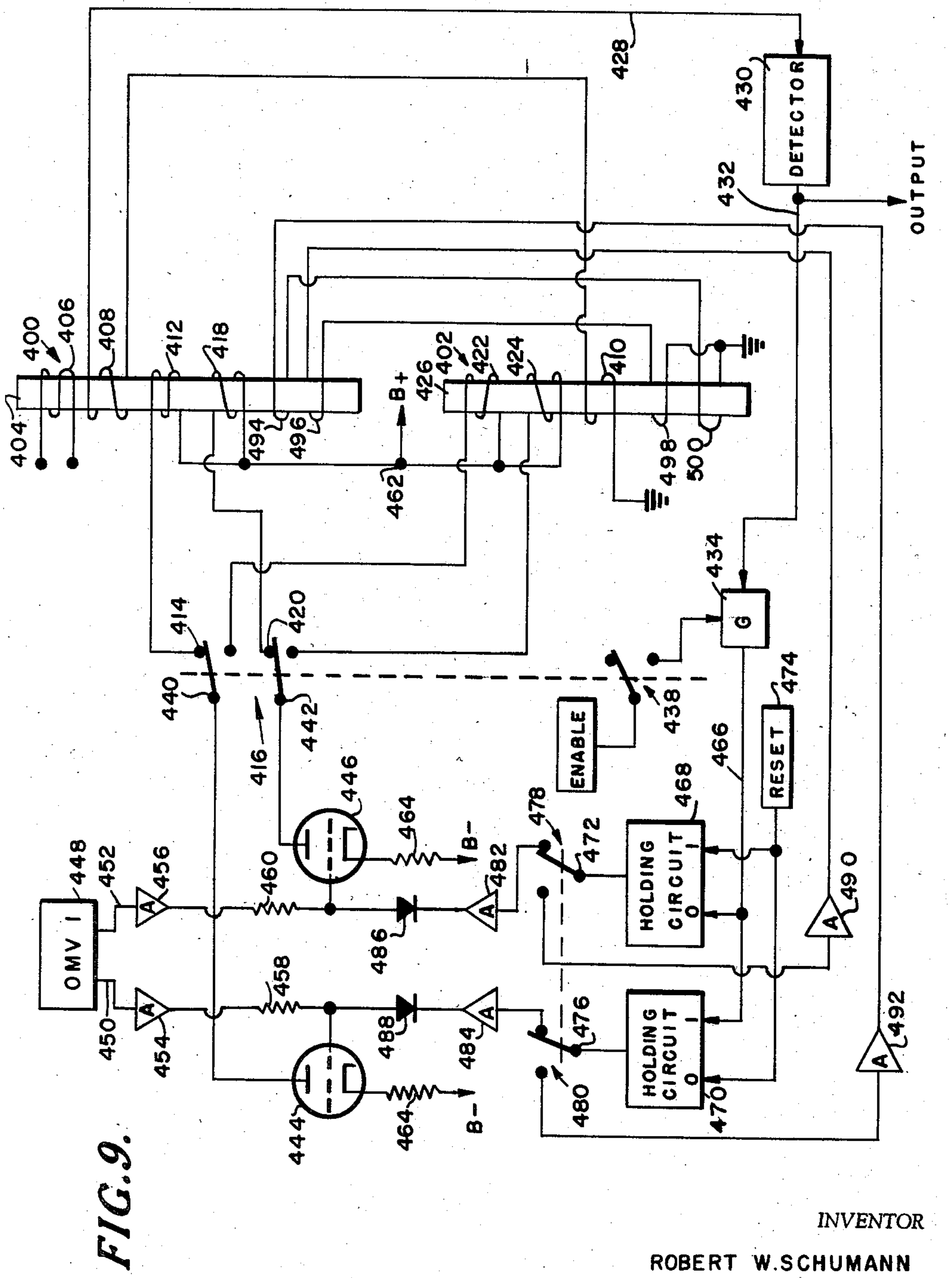
Figure 9 illustrates a modification of the invention whereby error created by either the excitation or the detector may be corrected by compensation in the excitation.

Another modification whereby error in the excitation system or in the detector may be compensated for is also illustrated in Figure 9. Any type of excitation and means of application thereof to the modulators may be used with this modification and limitation to the excitation means shown in Figure 9 is not intended. Conversely the modification now to be described forms no necessary part of the previous modifications described in relation to Figure 9, the switches 478 and 480 being included in the drawings merely for convenience in illustrating the different modifications. Assuming switches 478 and 480 to be in their left hand position (opposite to that illustrated), the voltages at terminals 472 and 476 are respectively applied to current generating amplifiers 490 and 492, which produce current outputs corresponding to the voltages at terminals 472 and 476, respectively, and thence to biasing windings on modulators 400 and 402. For example, magnetic core 404 may carry two small biasing windings 494 and 496 which windings are wound in opposition to each other. These windings are connected in series respectively with similar oppositely wound windings 498 and 500 on magnetic core 426, and thence to ground. The other end of windings 494 and 496 are connected respectively to the outputs of amplifiers 490 and 492. Windings 494, 496, 498 and 500 may be in the order of one turn on their respective cores to cause the necessary magnetic biasing for a corrected output on line 432. Again, only one holding circuit with one biasing winding on each magnetic core need be provided. With only one winding on each core, the current generating amplifier utilized therewith must supply bidirectional current to accomplish two-way correction.

Other methods of effectively adjusting the excitation will occur to those skilled in the art. For example, the wave shape of the excitation, and particularly the rise time thereof may be changed to vary the switching speed of the modulator on different half-cycles.

Thus, it is apparent that there has been provided by this invention apparatus to accomplish the objects and advantages herein set forth. Modifications of the invention will occur to those skilled in the art, but it is intended that the matter contained in the foregoing description and the accompanying drawings be interpreted as illustrative and not limitative, the scope of the invention being defined in the appended claims. Certain invention features of the above disclosure are claimed in my copending applications Serial Nos. 585,009 and 588,104, filed May 15, 1956.

What is claimed is:

1. In a system of the type which includes excitation means coupled at least to one primary magnetic core for alternately driving same into opposing states of flux density for determining given characteristics of a current to be measured and having an effect on said core, a reference magnetic core unaffected by said current, detector means, means for coupling the detector means to the reference and primary cores, means for coupling the excitation means to the reference core at predetermined times to cause the detector means at predetermined times to then respond to excitation of the reference core, deviation determining means coupled to the detector means to sense any zero deviation in the output of the detector means while the latter responds to the reference core, and feedback means coupling the output of the deviation determining means into the system to compensate for said zero deviation at least during excitation of said primary core.

2. A system as in claim 1 wherein the feedback output is coupled into the detector means.

3. A system as in claim 1 whereby the feedback means includes voltage holding means for maintaining a given amount of feedback during periods when other than the reference core is causing response of the detector means.

4. A system as in claim 1 wherein the detector means includes means for generating pulses of like polarity in response to each alternate driving of at least the reference core into the respective opposing states of flux density, and the detector means further includes means for sampling at least one set of said pulses for application to the deviation determining and feedback means.

5. Apparatus as in claim 1 wherein the detector means includes means for charging a capacitance during at least one set of alternate driving intervals of at least the reference core, and the detector means further includes means for discharging said capacitance at times following the said charging times.

6. Apparatus as in claim 1 wherein the feedback means includes capacitor means and means for adjusting the level of charge therein dependent upon the output of the detector means.

7. A system as in claim 6 wherein the feedback means includes at least two magnetic cores having at least one winding on each core in a circuit for controlling the charge on said capacitance.

8. A system as in claim 1 wherein the detector means includes means for sampling at least one of a set of pulses generated in response to driving at least the reference core into one of said states of flux density, wherein the deviation determining means includes means for sensing the amplitude of said sampled pulse as related to a threshold amplitude, and wherein the feedback means includes means responsive to said sampled pulse beyond said threshold level for adjusting the amount of feedback.

9. A system as in claim 8 wherein the detector means additionally includes means for sampling the interleaved set of pulses generated in response to driving at least the reference core into its opposite states of flux density, wherein the deviation determining means further includes means for determining the amplitudes of the last mentioned set of sampled pulses in relation to a threshold level, and wherein the feedback means has second means coupled to the deviation determining means so as to control said second means in accordance with pulses exceeding said threshold level for adjusting the feedback in a direction opposite from the adjustment resulting from first mentioned input to the feedback means.

10. A system as in claim 1 whereby the feedback output is coupled into the means for alternately driving the cores.

11. Apparatus as in claim 10 wherein the excitation means includes separate current generator means for driving first and second sets of interleaved current pulses through windings on the respective cores to drive the cores into the respective states of flux density, and wherein the feedback means includes means for differently controlling the amounts of said respective current to correct for any zero deviation in the detector means as detected during times when the detector is responding to excitation of the reference core by respectively altering the characteristics of the driving of the cores into the respective states of flux density.

12. A system as in claim 1 including a plurality of primary magnetic cores, a predetermined number greater than two of which are affected by different currents to be measured, and wherein the means for coupling the excitation means to the respective cores to cause the detector means at predetermined times to respond to the excitation of the reference core includes means for causing the detector means to respond to the respective primary cores affected by different currents in sequence and in time-sharing relation with each other and with said reference core.

13. A circuit for maintaining an adjusted voltage such as a feedback voltage on an output line in response to at least one pulsating input, the circuit comprising first and second magnetic cores, and an input flip-flop circuit having first and second inputs, a control circuit connected to the first input of the flip-flop means, a capacitance connected to have the charge therein control the level of voltage on said output line, a circuit for controlling the charge on the capacitance, said charge controlling circuit including at least one winding on each of said magnetic cores, and means for shifting one of said cores between opposite states of flux density in response to pulses on said control circuit connected to the first input of the flip-flop means for inducing voltages in said winding on said first core for causing a change in the state of charge of the capacitance in a first direction, and means including a circuit for applying pulses differing in time from those applied to the flip-flop first input to the flip-flop second input for shifting the second core between opposite states of flux density for inducing voltages in the winding of said capacitance charge control circuit on the second core for altering the amount of charge in the capacitance in a direction opposite from that resulting from shifting of the first core, the arrangement being such that respective pulse inputs to the first and second inputs of the flip-flop circuit will alter the charge on the capacitance by said shifting operation of the respective cores, and the level of voltage on the output line will be maintained substantially constant between the shifting operations of said cores.

14. A circuit as in claim 13 and further including at least one winding on each core each connected in a circuit for drawing a steady current of limited value to gradually reset said cores.

References Cited in the file of this patent

UNITED STATES PATENTS 2,254,943 Galle ---------------- Sept. 2, 1941